United States Patent [19]
Dohogne et al.

[11] 3,911,591
[45] Oct. 14, 1975

[54] BELT DRIVEN GYROSCOPIC INSTRUMENT FOR AN AIRCRAFT

[75] Inventors: James R. Dohogne; Glen W. Driskill, both of Phoenix, Ariz.

[73] Assignee: Sperry Rand Corporation, New York, N.Y.

[22] Filed: Mar. 27, 1972

[21] Appl. No.: 238,599

[52] U.S. Cl. ................................................. 33/330
[51] Int. Cl. ........................................... G01c 19/44
[58] Field of Search ..................... 33/328, 329, 330

[56] References Cited
UNITED STATES PATENTS

| | | | |
|---|---|---|---|
| 1,980,886 | 11/1934 | Talafre et al. | 33/328 |
| 3,039,200 | 6/1962 | Vibert | 33/328 |

FOREIGN PATENTS OR APPLICATIONS

| | | | |
|---|---|---|---|
| 666,615 | 2/1952 | United Kingdom | 33/330 |

Primary Examiner—Robert B. Hull
Attorney, Agent, or Firm—Howard P. Terry; Thomas J. Scott

[57] ABSTRACT

An improvement in panel-mounted gyroscopic attitude indicators for aircraft of the type having a generally spherical indicating element on which a horizon line divides the element into upper sky and lower ground portions. The indicating sphere is supported in an instrument housing with full roll freedom by a roll gimbal yoke directly attached to and driven in roll by a forward enlarged trunion of the full closed roll gimbal of a vertical gyroscope. The sphere is driven in pitch by a pulley and belt drive mechanism wherein the vertical gyro inner or pitch gimbal carries the drive pulley and the sphere carries the driven pulley. To provide the conventional "inside out" or reversed pitch sensing, the belt is reeved on the pulleys and in crossed or in "figure eight" fashion with the belt crossing or intersection located within the said enlarged forward trunion of the roll gimbal.

5 Claims, 2 Drawing Figures

BELT DRIVEN GYROSCOPIC INSTRUMENT FOR AN AIRCRAFT

BACKGROUND OF THE INVENTION

1. Field of the Invention

The subject invention pertains to the field of panel mounted gyroscopic aircraft attitude indicating instruments and particularly to those instruments for providing a visual indication of the attitude of an aircraft with respect to the horizon as defined by the pitch and roll axes of a panel mounted vertical gyroscope as compared with panel mounted attitude repeater instruments driven by a remotely located vertical gyro.

2. Description of the Prior Art

Prior art devices for indicating the attitude of an aircraft with respect to the horizon, usually defined by the pitch and roll gimbals of a vertical gyroscope have used a cantilevered support of the gyro's roll gimbal with a horizon bar driven by the gyro's pitch gimbal in a manner to provide the "inside-out" sensing of the horizon which requires reversing the sense of motion of the pitch gimbal. This normally requires complex linkage and/or gear systems between the horizon indicator and the pitch gimbal to reverse the pitch display. An example of a device using a complex gear system to reverse the display is described in U.S. Pat. No. 2,492,992 entitled "Gyro Horizon" issued to A. J. Handel, Jan. 3, 1950. This patent also discloses a rotor case mounted in a cantilevered bifurcated substantially U-shaped gimbal. An improvement over the Handel patent is described in U.S. Pat. No. 2,940,176, entitled "Horizon Indicator" issued to J. M. Jessup, June 14, 1960 and assigned to the same assignee as the subject application. The Jessup patent discloses a substantially rectangular gimbal in place of the bifurcated gimbal to improve the structural rigidity of the gyro and minimize deflections due to acceleration forces. However, the closed gimbal is also mounted in cantilever fashion which is objectionable in that it does not provide the desirable structural rigidity of the roll gimbal. It is preferable that the roll gimbal be a closed gimbal supported at both ends of its axis of rotation to provide rigid support for the comparatively heavy inner gimbal assembly, such structure also allowing for full range, proportional presentation of pitch attitude on a continuous indicating sphere.

The subject invention provides a full closed gimbal structure as the roll gimbal for the gyroscopic rotor gimbal or rotor case. It is supported at both ends of its axis of rotation thereby obviating the need of a relatively long trunion to support a cantilever structure. A separate spherical indicating element having a horizon line thereon with an upper sky depicting portion and a lower ground depicting portion is directly driven in roll by the forward trunnion of the roll gimbal and is driven in pitch by means of a "figure 8" belt or band drive from the rotor case, whereby to provide a simple means for presenting the orientation or attitude of the vehicle relative to a reference datum or horizon which eliminates any linkage and gear system to reverse the display.

SUMMARY OF THE INVENTION

The present invention provides a very simple, economically manufactured drive mechanism for the indicating sphere of a panel mounted attitude indicator mechanically driven directly from the roll and pitch gimbals of a local vertical gyroscope. The vertical gyroscope is generally conventional and includes a full closed roll or outer gimbal supported by trunnions in suitable bearings in an indicator housing for full freedom about the aircraft longitudinal axis. A rotor case or inner pitch gimbal is supported in journal bearings in said roll gimbal for limited freedom of rotation about a craft athwartship axis. The gyro rotor is journalled in spin bearings in said rotor case for spinning about a vertical axis.

The indicating sphere comprising a lightweight spherical shell-like structure having an equatorial line or horizon line depicted thereon and dividing the sphere into an upper or sky depicting portion and a lower or ground depicting portion. The sphere is journaled such that the horizon line moves up and down in pitch relative to a fixed reference representing the fore and aft axis of the aircraft and rotates in roll about the fixed reference. This journaling is provided by a lightweight normally horizontal U-shaped gimbal cantilevered directly on the forward trunnion of the vertical gyroscope so as to be positioned in roll directly thereby. A shaft extends between bearings at the extremities of the open gimbal arms which supports the sphere for motion about the pitch axis. The forward trunnion of the gyro roll gimbal is enlarged to a substantial diameter and is supported in a large diameter ball bearing or other antifriction bearing. A first large diameter pulley surrounds the rotor case and is fastened thereto such as to lie in a plane common to the gimbal roll axis and perpendicular to the inner gimbal axis while a second large diameter pulley is fastened to the sphere pitch axis support shaft such as to lie in the same plane as the first pulley. A band, strand, wire, or other flexible, linearly rigid filiment is reeved on said pulleys in figure 8 fashion and fastened at least to one of the pulleys to prevent slipping of the bands on the pulleys. The size and spacing of the pulleys is such that the intersection of the band lies within or in the vicinity of the large trunnion connecting the gyro gimbal and the sphere support gimbal whereby pitch motion of the rotor case correspondingly drives the sphere about the pitch axis but in a reverse sense to provide the pilot with the desired "inside out" sensing. Since both pulleys are journaled on the roll gimbal and the bands intersect within the trunnion and on the roll axis, motion of the roll gimbal does not couple into the sphere pitch axis. This configuration provides a direct reading display of the pitch and roll or attitude of the vehicle with respect to the horizon while obviating the need for a cantilever roll gimbal to support the gyroscopic rotor and the complex linkage and gear systems to reverse the pitch axis display.

DESCRIPTION OF THE PREFERRED EMBODIMENTS

Figure 1:
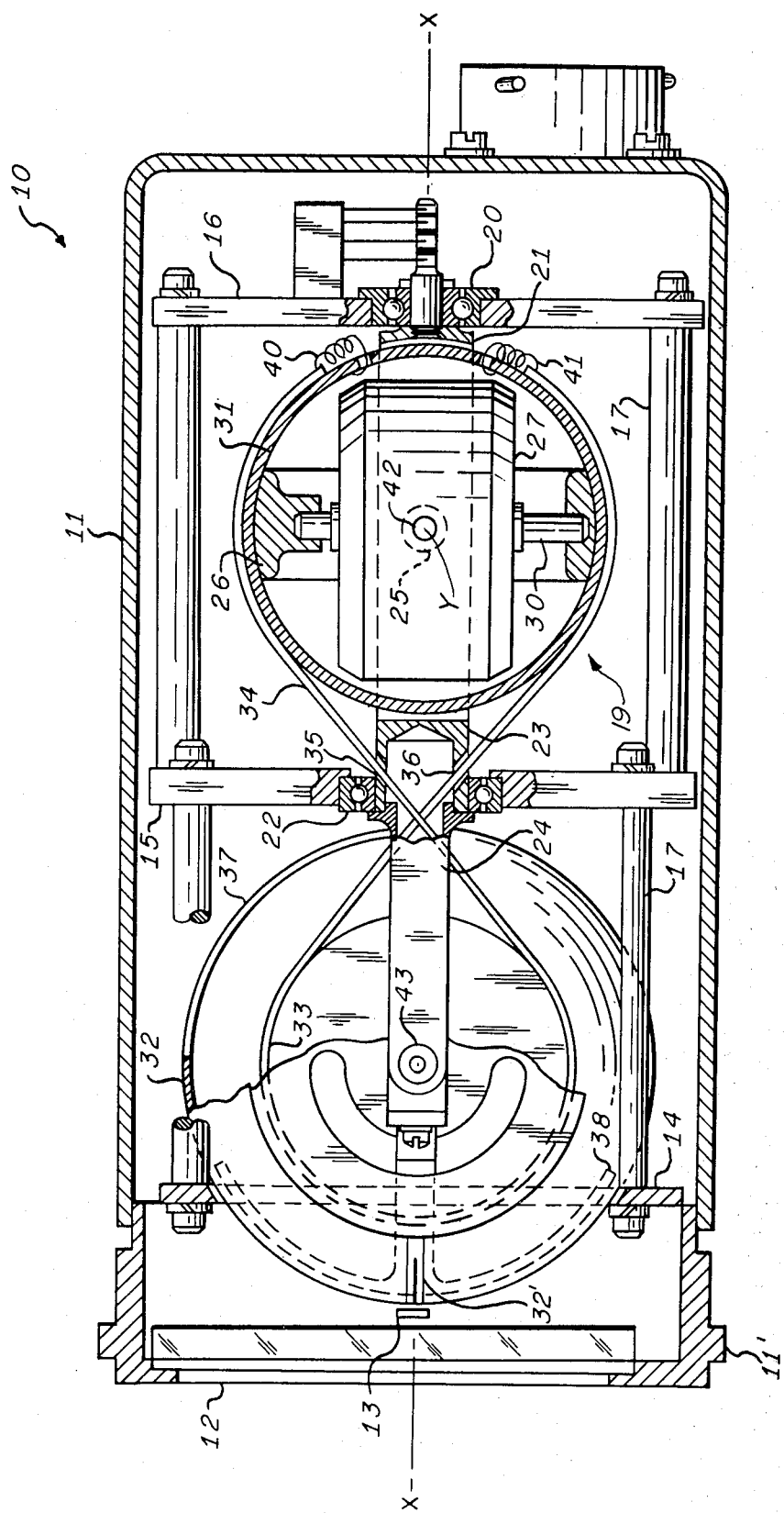
FIG. 1 is a cross section elevation view of the vertical gyroscope indicator of the present invention with the housing cut away and with certain of the elements shown in cross section.

A navigation instrument 10 as shown in FIG. 1 includes a housing 11 which is fixedly mounted within an aircraft with its longitudinal X—X axis preferably (but in some applications not necessarily) substantially aligned with the longitudinal axis of the aircraft. The housing 11 includes an instrument bezel 11' having a viewing opening 12 normally facing the pilot and having a suitable reference datum 13, which may include or comprise a horizontal line or the conventional miniature aircraft symbol fixedly supported on the housing and defining the craft longitudinal and lateral axes. Also included in the housing 11 are appropriate instrument supporting structures or bulkheads such as a first mounting plate 14 secured to bezel 11', a second mounting plate 15, a third mounting plate 16 disposed between the plates 14, 15 and 16 and support spacers 17. A roll gimbal bearing 20 located substantially central of the third mounting plate 16 supports one end or rear trunnion of a full roll gimbal 21 of a vertical gyroscope 19. A second or forward roll gimbal bearing 22 located substantially centrally of the second mounting plate 15 supports an enlarged diameter journal trunnion 23 of the other end of the gyro roll gimbal 21. Two pitch axis bearings 25 (FIG. 2) on gimbal 21 support the pitch gimbal 21 or rotor case 26 on the roll gimbal 21 through stub shafts 42. A gyroscopic rotor 27 is journalled in suitable spin bearings (not shown) on vertical shaft 30 supported in the inner pitch gimbal 26. The shaft 30 may of course include electrical drive means for spinning the rotor 27. The inner pitch gimbal or rotor case 26 supports a first drive pulley 31 such that its axis corresponds with the pitch axis Y—Y of the gyro 19 and its drive surface lies substantially in the plane including the roll axis of the gyro and which is perpendicular to the pitch axis.

Secured to or cantilevered on the enlarged forward trunion 23 of roll gimbal 21 is a generally U-shaped gimbal 24 oriented such that its plane is generally coincident with the plane of roll gimbal 21. At or near the extremities of the spaced arms of the gimbal 24 are suitable bearings 28 for supporting a shaft 43.

Figure 2:
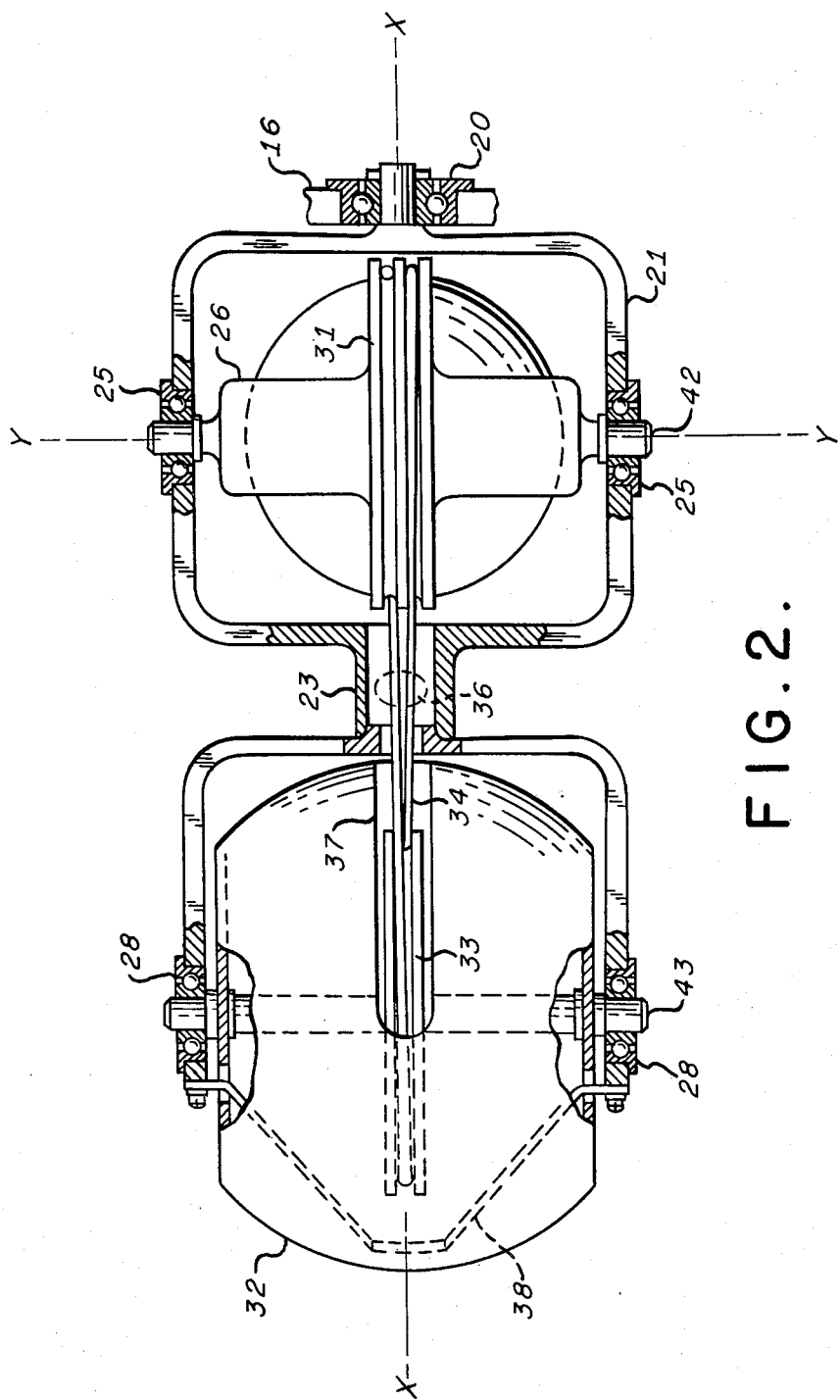
FIG. 2 is a horizontal or plane section through the housing showing the arrangement of the interior elements with certain of the elements shown in cross section.

A generally spherical element 32 constitutes the attitude indicating member of the instrument. As shown in FIG. 2, the sphere 32 is partially truncated on its sides to adapt it to fit between the spaced arms of the gimbal 24 with the spherical surface portion extending through an opening in forward bulkhead 14. Suitable masking elements (not shown) may be provided on bulkhead 14 with roll and pitch attitude indices thereon as is conventional in the art. The sphere 32 is fixedly attached to shaft 43 so that it is free to pivot about an axis parallel to the pitch axis Y—Y of the gyro 19 and rotate about the roll axis X—X of the gyro 19. The sphere 32 has an equatorial line 32' dividing the upper and lower halves of the sphere into sky and ground depicting portions respectively.

Secured to the shaft 43 is a second pulley 33. It is located at the center of the shaft 43 and lies in the same plane as the first pulley 31, i.e., it lies in a plane including the roll axis X—X and is perpendicular to the inner gimbal axis Y—Y.

A belt or band means 34 is reeved in the pulleys in figure eight fashion, that is, it is connected such that the band extends from the top of pulley 31 to the bottom of pulley 33 and vice versa, and the intersection lies within or closely adjacent the trunion 23. The journal or trunion 23 has two openings 35 and 36 which allow the drive means or bands 34 to pass through and crossover in the vicinity of the trunnion 23 and substantially on the roll axis X—X of the system. The spherical element 32 has a slot 37 of sufficient width and length to allow the drive wires or bands 34 freely to pass therethrough so that motion of the pitch gimbal 26 imparts a proportional and opposite motion of sphere 32 about the pitch axis through approximately ±90°. The drive means 34 may be affixed to the drive pulley 31 through springs 40 and 41 (or their equivalent) which insure that a proper amount of tension is provided between the drive means 34 and the drive pulley 21. This tension must be carefully calibrated and adjusted so as to minimize loading on the gyro pitch bearings 25 and yet compensate for ambient temperature change.

An additional desirable feature of providing a visual warning to the pilot at high (±) pitch attitudes may be incorporated by attaching a colored plate 38 to the gimbal 24 concentrically within the sphere as shown. At higher pitch attitudes, this plate will be visible through slot 37.

In operation, when the aircraft changes the attitude of its pitch axis Y—Y for example, by performing a climbing maneuver, the gyro rotor case 26 will of course maintain its spin axis vertical while the craft rotates around it (craft X—X axis tilts up). Since the drive pulley 31 is fixed to the rotor case it will have effectively rotated clockwise relative to the vehicle X—X axis. The clockwise rotation of the drive pulley 31 will be transmitted through the trunnion 23 by belt drive means 34 to the sphere pulley 33 to produce a counterclockwise rotation of the spherical element 32 and a "downward" movement of the horizon line 32' relative to the reference aircraft symbol 13 whereby the aircraft symbol lies in the upper or sky portion of the sphere thereby indicating a "pitch up" attitude. The angular rotation of the spherical element 32 is related to the angular rotation of the drive pulley 31 by the following relationship:

$$\frac{\theta_D}{\theta_A} = \frac{R_2}{R_1}$$

Where
$\theta_D$ = the displayed pitch angle,
$\theta_A$ = aircraft pitch angle,
$R_1$ = diameter of the driven pulley 33,
$R_2$ = diameter of the drive pulley 31.

When the diameter of the drive pulley 31 equals the diameter of the driven pulley 33, the displayed pitch angle will be equal to the pitch angle of the aircraft which is the normal and preferred ratio. However, it will be readily appreciated that the relative diameters of the drive pulley 31 and the driven pulley 33 may be chosen to provide a drive amplification ratio by making the diameter of the drive pulley 31 larger than the diameter of the driven pulley 33, and conversely.

The sphere pitch axis bearing 28 may be relatively small in contrast to the pitch axis bearings 25 of the gyroscope because of the small weight of the sphere. For the same reason, the bifurcated gimbal 24 may be of low weight construction. Further, any friction inserted into the gyro gimbal system by the belt drive means 34 is minimal because no rubbing friction takes place along the belt and the bearing loading produced by the belt is slight. Rubbing of the belt drive means 34 at the point of crossing inside the journal 23 may be prevented either by locating the drive pulley 31 and the driven pulley 33 slightly non-coplanar with respect to each other to provide clearance or by providing suitable axially spaced grooves in the pulleys.

Additionally, for remote indication of aircraft attitude, pickoff means may be conveniently mounted within the spherical element 32 or on the vertical gyro gimbal axes to provide output signals indicative of the orientation of the vehicle with respect to the pitch and roll axes of the device without unduly loading the gyroscopic rotor 27.

The gyroscopic rotor 27 may be erected by mechanical means in a conventional manner as taught in U.S. Pat. No. 2,603,095 entitled "Gyro Erecting Mechanism" issued to C. E. Barkelow on July 15, 1952. Alternatively, conventional electrical erecting means may be used which includes conventional electrical torquers controlled from toroidal electrolytic sensing devices such as described in U.S. Pat. No. 3,604,275 entitled "Toroidal Electrolytic Sensor" issued to Terrance S. Fox and Glen W. Driskill on Sept. 14, 1971 and assigned to the same assignee as the subject application. It will be understood that certain elements of the electrical erecting system may also be enclosed within the display sphere.

It will be appreciated that the configuration of the disclosed invention reduces the size of the clearance swing circle required for cantilevered roll gimbal 24 because of the elimination of the complex mechanisms required to reverse the pitch display in prior art devices. This allows greater space at the periphery of the clearance circle for the inclusion of flight director pointers, warnings flags and the like. This also provides an attendant reduction in the pitch axis friction which also improves the performance and accuracy of the device.

An additional feature of this configuration allows the 0° pitch reference to be easily varied (trim adjustment) so that the device may be mounted in panels having different inclination angles, i.e., the angular position of the spherical element 32 may be varied with respect to the angular position of the drive pulley 31 prior to installation by changing the point on the circumference of the drive pulley 31 at which the belt drive means 34 is affixed.

Furthermore, while in the disclosed embodiment the gyroscope positions an indicating member through the present novel belt drive means, it will be understood that the same drive means may be employed to stabilize a further gimbal system. For example, the indicating member may be replaced by a further gyroscope, such as a directional gyroscope to thereby provide a gyro platform or gyroscopic heading and attitude reference system.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A gyroscopic attitude indicator instrument for aircraft comprising a housing having a plurality of support walls, one of said walls including a viewing opening therein and a reference index within said opening representative of a reference axis of said aircraft,
 gyroscopic means mounted between two of said support walls for detecting the attitude of said aircraft axis relative to a fixed direction in space,
 attitude indicator means mounted in a bifurcate structure having a trunnion rotatively positioned within a bearing disposed in one of said walls of said housing, said indicator means being viewable through said opening and cooperative with said reference index for indicating the attitude of said craft axis relative to said fixed direction, and
 flexible belt drive means coupled between said gyroscopic means and said indicator means in crossed fashion wherein the crossing point of said belt drive means is located within said trunnion thereby providing reversed pitch sensing by rotating said indicator means in an opposite direction relative to said reference indices.

2. The attitude indicator as set forth in claim 1 wherein said flexible belt drive means includes pulleys connected to said gyroscopic means and said attitude indicator means, and flexible belt means reeved on said pulleys whereby said indicator means is positioned by said gyroscopic means.

3. The attitude indicator as set forth in claim 2 wherein said pulley connected to said gyroscopic means has a diameter $R_2$ and said pulley connected to said attitude indicator means has a diameter $R_1$ whereby said attitude indicator means is displaced by an angle $\theta_D$ in accordance with the relationship $\theta_D = R_2/R_1 \times \theta_A$ in which $\theta_A$ is the pitch angle of the aircraft.

4. The attitude indicator as set forth in claim 2 which further includes spring means coupled between said flexible belt means and said pulley connected to said gyroscopic means for providing a proper amount of tension in said flexible belt means between said gyrosopic means and said attitude indicator means.

5. A gyroscopic instrument for aircraft comprising,
 an instrument housing,
 a vertical gyroscope located at one end of said housing and a member adapted to be stabilized at the other end of said housing,
 a common roll gimbal for said member and said gyroscope, said gimbal being a doubly supported whole gimbal enclosing said gyroscope and including an enlarged trunnion therebetween for rotatably supporting said roll gimbal in said housing whereby said member is positioned directly in roll by said gyroscope, and
 means coupled between said member and said gyroscope for positioning said member in pitch including,
 a pair of pulley means, one connected with said gyroscope and one connected with said member and
 flexible belt means reeved on said pulleys in figure eight fashion, the crossover of said belt means being located substantially within said enlarged trunnion of said common gimbal.

* * * * *